Aug. 25, 1964 F. M. YOUNG 3,146,343

HYBRID ARITHMETIC COMPUTING ELEMENTS

Filed Aug. 3, 1960 4 Sheets-Sheet 1

INVENTOR.
F. MANSFIELD YOUNG
BY Kenway, Jenney, Witter & Hildreth
ATTORNEYS

HYBRID ARITHMETIC COMPUTING ELEMENTS

Filed Aug. 3, 1960 4 Sheets-Sheet 2

INVENTOR.
F. MANSFIELD YOUNG
BY Conway, Jenney, Willis & Hildreth
ATTORNEYS

HYBRID ARITHMETIC COMPUTING ELEMENTS

Filed Aug. 3, 1960 4 Sheets-Sheet 3

INVENTOR.
F. MANSFIELD YOUNG

BY Kenway, Jenney, Witter & Hildreth

ATTORNEYS

| | B | C | D | A |
|---|---|---|---|---|
| $t_1$ | O | O | Full Scale | $N_1$ |
| $t_2$ | N | O | 180° | $\frac{N_1 - N_2}{180°}$ |
| $t_3$ | $N_1$ | 32° | $\frac{N_1 - N_2}{180°}$ | $\frac{N_s - N_1 + 32° \frac{N_1 - N_2}{180°}}{\frac{N_1 - N_2}{180°}}$ |

INVENTOR.
F. MANSFIELD YOUNG
BY Kenway, Jenney, Witter & Hildreth
ATTORNEYS

United States Patent Office 3,146,343

Patented Aug. 25, 1964

3,146,343

HYBRID ARITHMETIC COMPUTING ELEMENTS

Frink M. Young, Boston, Mass., assignor to Adage, Inc., Cambridge, Mass., a corporation of Massachusetts Filed Aug. 3, 1960, Ser. No. 47,244
6 Claims. (Cl. 235—150)

My invention relates to novel computing devices and computers in which computation is performed utilizing both analog and digital computing apparatus. More particularly my invention relates to computing devices utilizing analog to digital converters of the feedback type, in combination with other apparatus to perform computing functions utilizing both analog and digital techniques.

Analog to digital converters of the feedback type are known and have become the preferred type in most applications. Converters of this general type are disclosed for example in United States Patent No. 2,539,623 entitled "Communication System" issued January 30, 1951, and United States Patent No. 2,784,396 entitled "High Speed Electronic Analogue to Digital Converter System" issued March 5, 1957. An improved converter of the feedback type is disclosed in the co-pending application of Young et al., Serial No. 832,039 filed August 6, 1959, now Patent No. 3,052,880, which is assigned to the assignee of this application.

In general, analog to digital converters of the feedback type include an input terminal to which the analog signal to be converted is connected, the input terminal in turn being connected to a summing junction. The output signal from the summing junction is connected to the analog to digital converter which stores in a digital storage register a number corresponding to the magnitude of the input signal from the summing junction. The digital storage register in which the numerical value of the signal is stored controls a digital to analog converter. This converter is supplied a fixed voltage (or current) from a reference source and the digital to analog converter output is a signal, (voltage or current as may be appropriate) whose amplitude corresponds to the number stored in the register. The analog output signal from the digital to analog converter is connected to the summing junction to complete the feedback loop around the analog to digital converter. The polarity of the reference source is selected so that when signals of equal amplitude are fed to the summing junction from the input terminal and the digital to analog converter, the two signals cancel.

In operation, the analog to digital converter progressively changes the number stored in the digital storage register in a programmed manner until the signal from the controlled digital to analog converter corresponding to the stored number just balances the input signal. At this time the summing junction output signal is substantially zero and conversion ceases.

This description is greatly simplified. In actual practice sample and hold circuits may be provided to hold samples of the input signal until a conversion is completed. Further programming circuits may be provided to program certain steps in the conversion process. However these additional features are desirable but not required for the practice of my invention, as will more fully appear below.

Analog to digital converters have, in the past, been widely used to convert the output signal from a transducer such as is used for measuring temperature, pressure, etc., which is typically in analog form to a digital signal. The digital signal is easier to use in later computation and may be more readily stored or processed with other information than the corresponding analog signal. To establish proper scale factors and reference levels, calibration or scale signals are often included with the analog signal. These signals are particularly important if the transducer is at a remote location and the signals are being transmitted by a data link; access to the instrument to check its operation may be impossible, and variation in supply voltages or changes in parameter values at the instrument may impair the measurements if repeated calibration checks are not made. Additionally after conversion of the signal it is many times desirable to modify it, as by subtracting a known reference level from it, so that only variations with respect to a given level are displayed.

Prior to my invention it was the usual practice to convert the analog signal as it came from the transducer to a digital signal and supply it to a digital computer which would then perform whatever calculations were required to provide the data in the desired form. Synchronizing signals were transmitted from the transducer (or the device controlling its operation) to the computer, so that it could identify which signals were calibration or scale factor signals and which were measured values. From the synchronizing signals and the data supplied by the analog to digital converter, the computer would make the necessary calculations to supply the desired data.

While the apparatus described above has proven satisfactory in operation it is sometimes expensive since a separate digital computer is required to perform computations for each analog to digital converter. I have found that by using a number of additional storage registers, with associated digital to analog converters and transfer gates in conjunction with an analog to digital converter of the feedback type, I can perform many of the required calculation described above and obviate the need for an accessory digital computer. Since the analog to digital converted is necessary in any event, and the additional cost of the registers, gates and converters is much less than an additional computer, substantial savings are effected. Computing devices made according to my invention perform both digital computation with the signals in numerical form and analog computation with the transformed numbers in analog form. In effect, in devices made according to my invention, computation is carried on in two "languages." For this reason and in the absence of any descriptive adjective in the art for devices of this type, I call them "bilingual."

Accordingly, it is a principal object of my invention to provide a bilingual computing device. Another object of my invention is to provide a bilingual computing device capable of continuously subtracting from or adding to a digital signal representing an analog variable a number corresponding to a reference level which has previously been programmed with the analog signal. A further object of my invention is to provide a bilingual computing device capable of multiplying a reference level programmed with the signal by a constant or by another reference level also programmed with the signal and continuously adding or subtracting this from the numerical output. Still another object of my invention is to provide computing devices of the character described capable of continuously taking the ratio of the output signal to a previously programmed value. A still further object of my invention is to provide bilingual computers incorporating a number of individual computing devices of the character described. Yet a further object of my invention is to provide bilingual computing devices and computers which are simple in construction, efficient in operation and relatively low in cost.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings.

Figure 2:
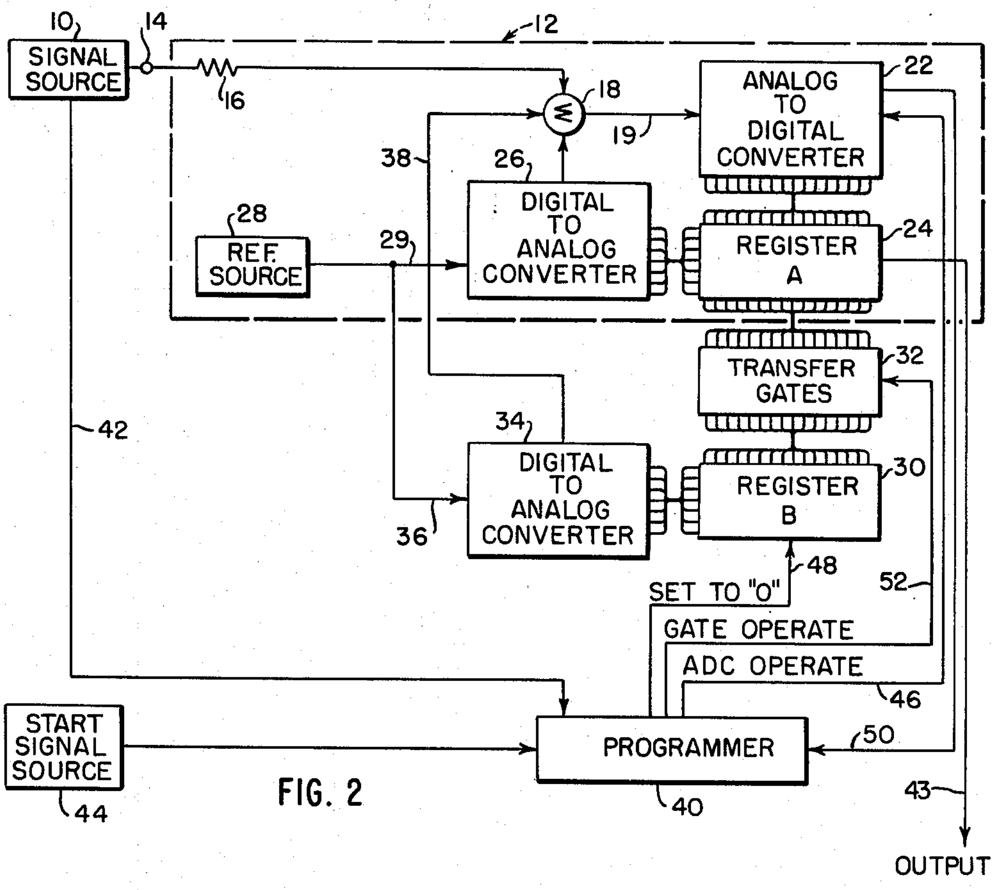
FIG. 2 is a block and line diagram illustrating the construction of a bilingual computing device for transforming the analog signal of FIG. 1 to a digital signal and continuously subtracting the reference level therefrom.
Figure 4:
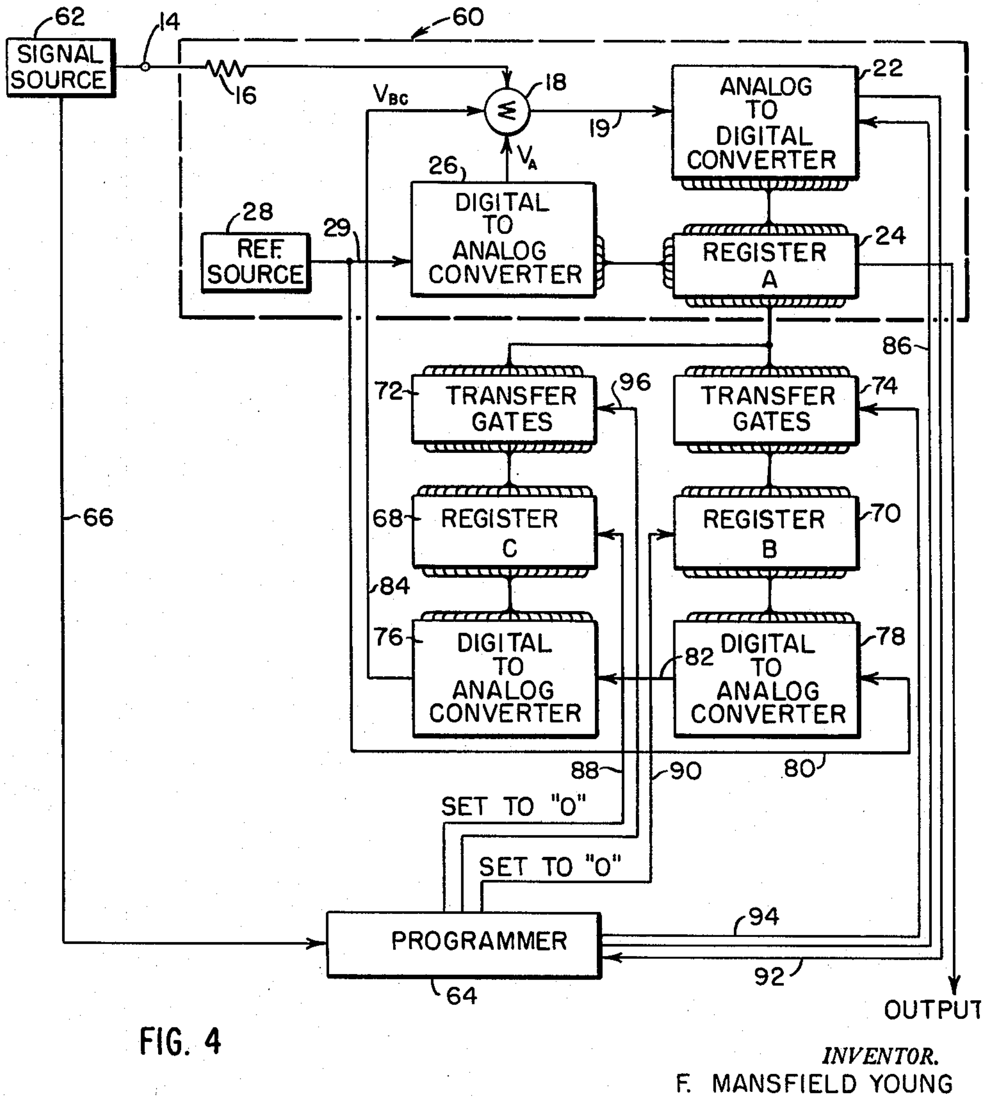
FIG. 4 is a block and line diagram illustrating the construction of a bilingual computing device for continuously subtracting the product of the reference levels of FIG. 3 from the digital value of the transformed analog signal.
Figure 6:
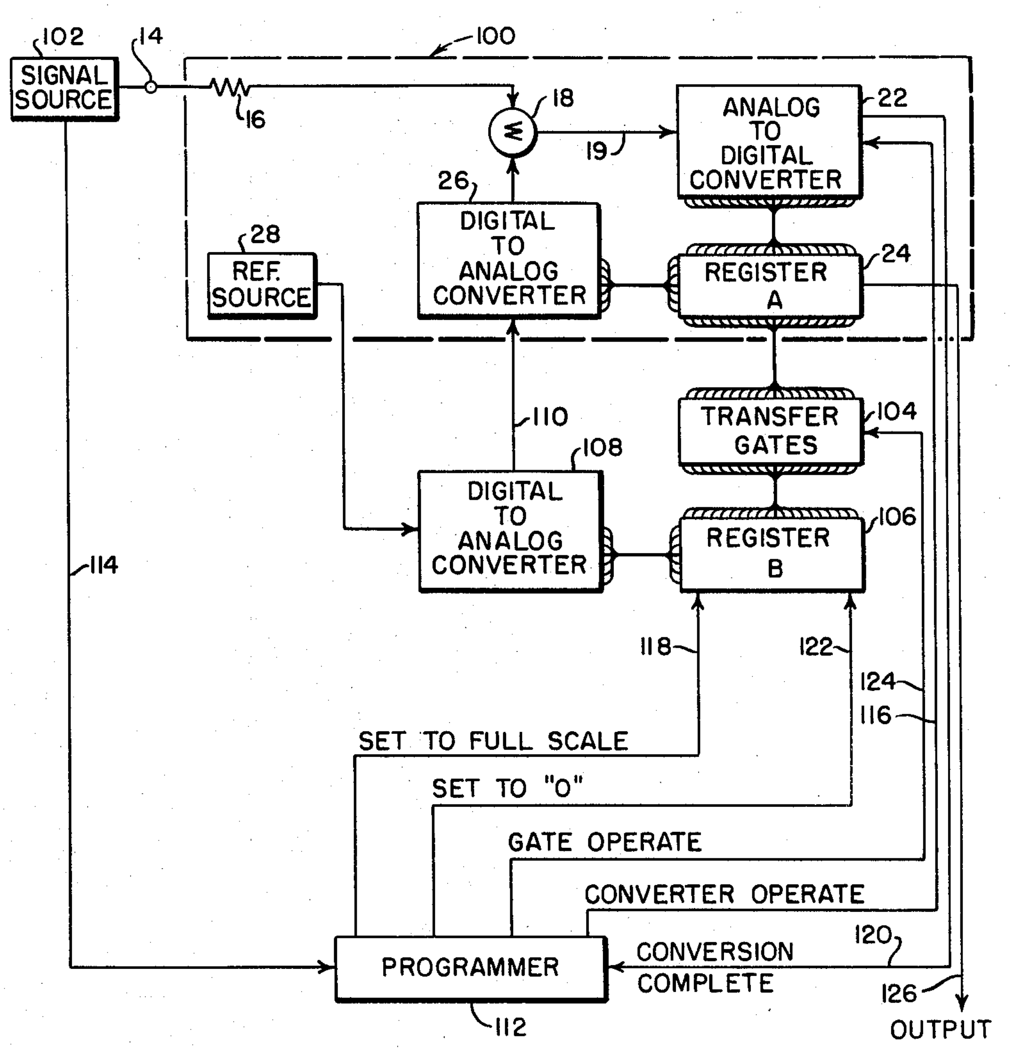
FIG. 6 is a block and line diagram of a bilingual computing device for continuously taking the ratio of the digital number corresponding to the analog signal to the reference level.
Figures 7, 8, 9:
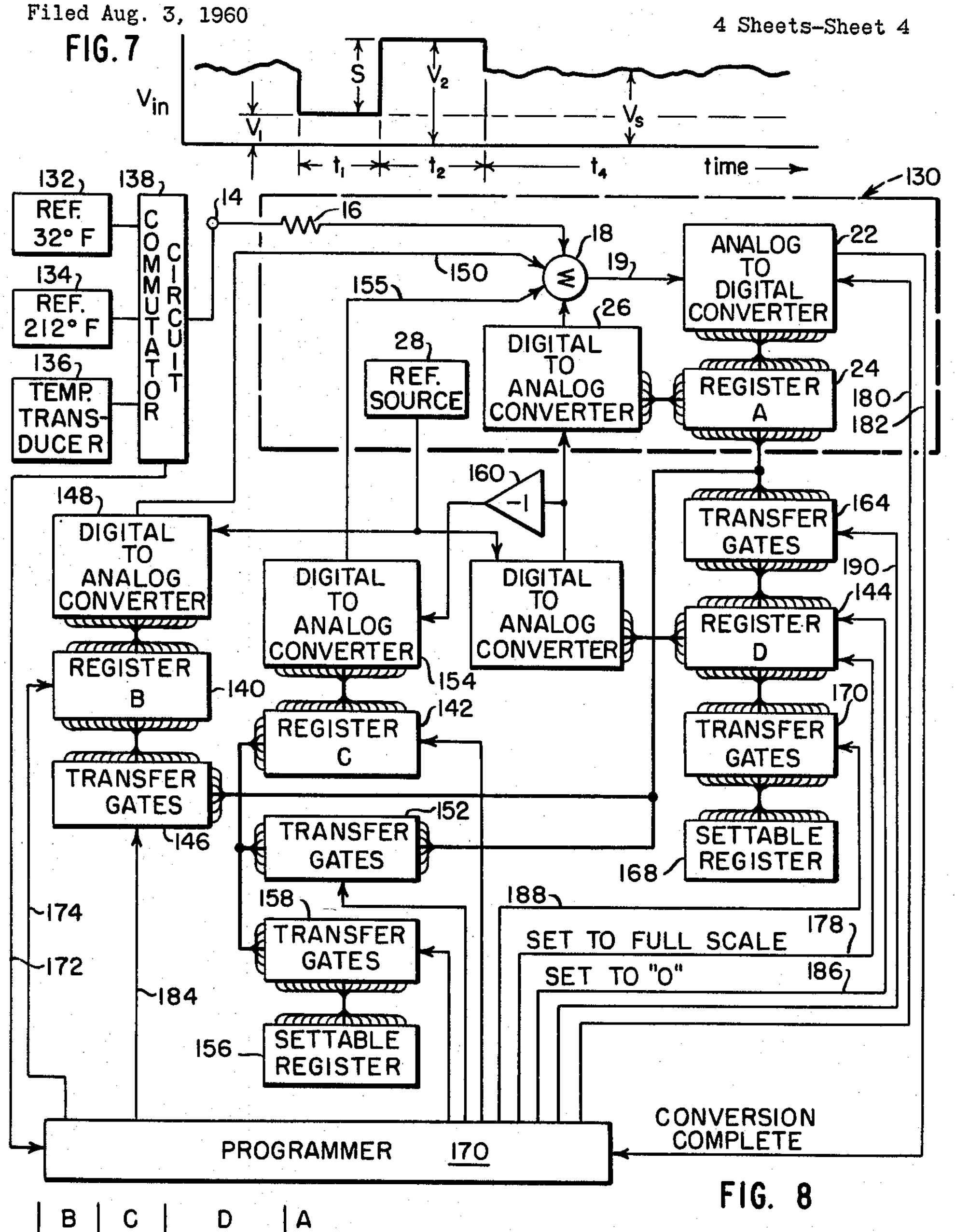
FIG. 7 is a graph illustrative of the type of analog signal as a function of time which is typically transmitted from a remote temperature transducer, including calibration and reference levels.

FIG. 8 is a block and line diagram of a bilingual computer, including therein the computing elements of FIGS. 2, 4 and 6 in combination to provide a numerical output corresponding to the actual temperature from the analog signal of FIG. 7 in the appropriate temperature scale; and FIG. 9 is a table indicating the conditions of the registers of the computing device of FIG. 8 during various operating conditions.

I. DEVICES FOR ADDITION AND SUBTRACTION

Figure 1:
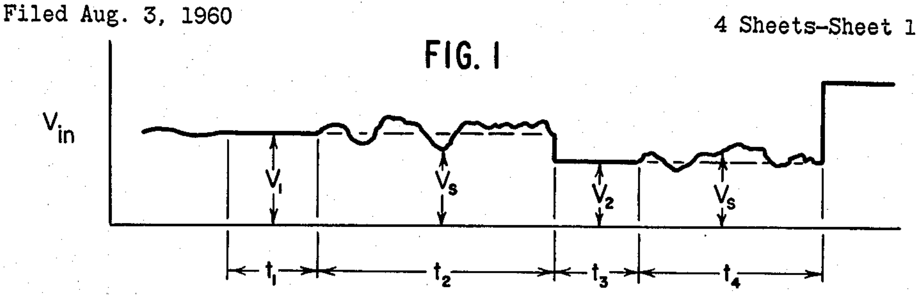
FIG. 1 is a graph of an analog signal containing a reference level programmed with the signal.

Before describing a computing device made according to my invention capable of continuous addition or subtraction, I will first explain, by referring to FIG. 1, how analog signals requiring such computation come about.

For example, in certain applications a number of transducers, each measuring the same variable at a different location, are provided. It is often desired to periodically measure the signal from each transducer. If the transducers include a bridge circuit, each bridge will have a slightly different unbalance when the transducer is at its reference position. For this reason, it is desirable in each case to measure the bridge unbalance and subtract this unbalance from the numerical value of the analog signal. To this end, there is programmed, for each transducer, a period when only the unbalance signal is being transmitted and this value may then be subtracted from the measured signal to give true signal variation.

A signal of this description is shown in FIG. 1. In the period $t_1$, the unbalance voltage $V_1$ is supplied from the signal source. Subsequently, in the period $t_2$ the signal from the transducer having the unbalance signal $V_1$ is transmitted. In the period $t_3$ the unbalance voltage from a second transducer is transmitted and in the period $t_4$ the measured signal value from that transducer. In the periods $t_2$ and $t_4$ it is desirable to subtract from the actual numerical measured value of the signal, a numerical value corresponding to $V_1$ and $V_2$ respectively. As explained above, a computer has been used in the past to make this computation. A simpler, less expensive, and more reliable device made according to my invention for accomplishing this result is shown in FIG. 2.

As shown, a signal source 10 supplies a signal having the waveform of the type illustrated in FIG. 1 to an analog to digital converter of the feedback type generally indicated at 12 and enclosed within the broken outline. All the components within the broken line represent components of a typical analog to digital converter, as disclosed in the references set forth above. Analog to digital converters of this type include an input terminal 14 which is connected by a resistor or other isolating impedance 16 to a summing junction 18. The summing junction in turn is connected by lead 19 to the actual analog to digital converter 22. The converter 22 stores the digital number which it generates in the storage register 24, here labeled "Register A." Register 24 in turn controls a digital to analog converter 26 which is supplied with a reference voltage or current from the source 28. The output of the digital to analog converter 26 is a voltage or current whose amplitude is a direct function of the number stored in register A. This output signal is summed at the summing junction 18 with the input signal and, when the input signal is exactly balanced by the signal from the digital to analog converter, conversion ceases and the number stored in register A is a measure of the input signal magnitude.

No specific detailed circuitry has been illustrated for the various components of the analog to digital converter since such devices are known in the art. Further, it is to be understood that computing devices made according to my invention may utilize any one of a number of different analog to digital converters, so long as these converters are of the feedback type described. The associated circuitry will be determined by the choice of analog to digital converter.

To implement the computing functions of the circuit a second storage register 30 is provided, this register being substantially identical to register A and being identified as register B. A plurality of transfer gates 32 are provided for transferring the digital information stored in register A into register B upon the application of a control signal in common to all the transfer gates. A number of different types of well-known gate circuits might be used for the transfer gates. For example a plurality of "and" circuits of the type shown and described at page 15–45 of Hunter, "Handbook of Semiconductor Electronics" McGraw-Hill, 1946 might be used, one input terminal of each "and" circuit being connected to the appropriate terminal in register A and the other input terminal of each gate being connected in common to the control terminal for the gates. Upon the application of an appropriate signal to the control terminal of the gates, they operate simultaneously to set register B in accordance with the number presently in register A.

Register B controls the digital to analog converter 34 in substantially the same manner as register A controls converter 26. Digital to analog converter 34 is preferably identical to converter 26 and is supplied from the same reference source via lead 36. As mentioned above, this source is preferably of opposite polarity to the input signal, and is switched in accordance with input signal polarity. The output signal from the converter 34 is connected to the summing junction 18 via lead 38.

A programmer 40, which may be a stepping register with associated gate circuits, similar to that disclosed in the above-identified co-pending application of Young et al. for control of the analog to digital converter there described, is also provided. Appropriate synchronizing signals are supplies to the programmer from the signal source 10 via lead 42, and the programmer controls the operation of the computer in accordance with these signals, as will be explained below. The output signal from the computer appears on the cable 43 connected to the A register.

To explain the operation of the device of FIG. 2 it will be assumed that signal generator 10 is supplying a signal of substantially the form shown in FIG. 1 and a "START" signal is supplied to the programmer either from the signal source or from an external source 44 at the start of the period $t_1$ in FIG. 1. Upon receipt of the "START" signal, the programmer supplies a "START" signal to the analog to digital converter via lead 46 and supplies a "SET TO 0" signal to the appropriate terminal of register B over lead 48 so that a zero is stored therein. Following the "START" signal a steady voltage such as $V_1$ is present at the input terminal 14, and the analog to digital converter stores a number $N_1$ in register A corresponding to $V_1$. The signal from converter 34 will have no effect since register B has been set to 0. The completion of conversion is indicated by an appropriate signal transmitted over lead 50 to the programmer which then causes transfer gates 30 to operate by supplying a signal to them on lead 52. During and immediately after the transfer to register B, the number in register A is held at $N_1$ by the control and programming circuits associated with the analog to digital converter 12.

At the beginning of period $t_2$, an appropriate signal is again supplied to the programmer from the signal source to indicate that measurement is to take place. However, the numbers stored in register A will now represent the difference between the number stored in register B corresponding to the unbalance and the signal, i.e. $N_A=N_S-N_1$, since the portion of the input signal corresponding to initial unbalance, is offset by the signal from converter 34.

It is important to note that since analog to digital converters of the feedback type balance the feedback signal against the incoming signal, subtraction is accomplished when both converters are fed from the same reference source. If it is desired to add the number stored in register B to the signal, either the polarity of the reference source feeding converter 34 is reversed or the polarity of the signal appearing on lead 38 is inverted. A circuit for addition as opposed to subtraction is described below in connection with FIG. 8.

Following the conclusion of period $t_2$ in FIG. 1, a new "START" signal is supplied to programmer 40 from the signal source 10. This has the same effect as the original "START" signal and thus register B is again set to 0, and register A, after conversion, has a number corresponding to $V_2$ set therein. Thereafter signal measurements may be made with $V_2$ as opposed to $V_1$ subtracted from the signal.

Thus by storing the signal value it is desired to subtract from the actual signal in a digital storage register and converting this stored signal to an analog signal which can then be used to offset a portion of the incoming signal, the device of FIG. 2, obviates the need for a separate digital computer to perform this function, and requires only a minimum of additional circuitry.

It is obvious that the circuit of FIG. 2 is capable of generally adding or subtracting a constant programmed signal from subsequent signals and is of general application, although it has been described with respect to a specific application. Also, the number of separate registers adding or subtracting measured values from the signal may be increased as appropriate, one register being provided for each quantity to be measured and then added or subtracted.

II. MULTIPLICATION AND ADDITION OR SUBTRACTION

In the example described above, the characterizing equation was $$A=V_{in}-B \quad (1)$$

If instead of this equation, the characterizing equation is $$A=V_{in}-BC \quad (2)$$

either B or C or both being present as constant signal values at different times in the signal it is necessary to perform a multiplication. This situation may arise for example where it is desired to add to or subtract from a signal a previously measured value, but the measured value in turn must be corrected by multiplying it by either a constant or a second measured value.

Figure 3:
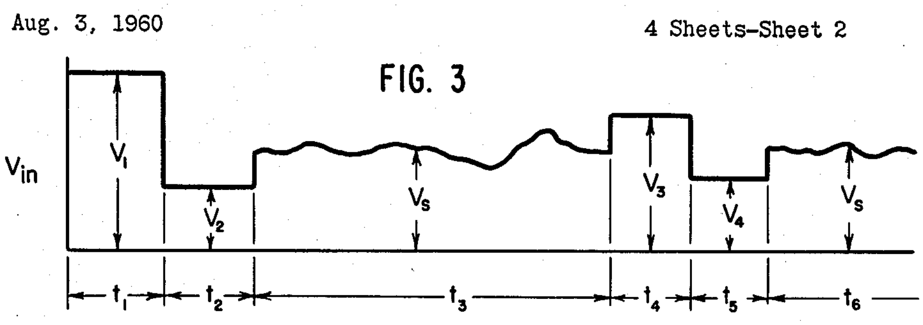
FIG. 3 is a graph as a function of time of an analog signal containing a pair of reference levels.

A waveform of this type is shown in FIG. 3. It is assumed, for purposes of this explanation, that the signal to be measured is the varying quantity of periods $t_3$ and $t_6$ less the value $V_2$ of period $t_2$ and the value $V_4$ of the period $t_5$ respectively. It is also assumed that the voltages $V_2$ and $V_4$ must have a correction factor applied to them depending on the amplitude of the voltages measured in period $t_1$ or $t_4$ respectively. Thus the desired signal in period $t_3$ is:

$$S=V_S-V_2\times V_1 \quad (3)$$

and that during period $t_6$ is:

$$S=V_S-V_4\times V_3 \quad (4)$$

Figure 5:
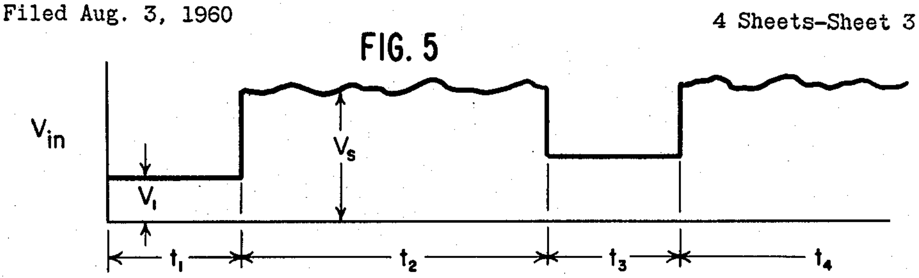
FIG. 5 is another graph as a function of time of an analog signal having reference levels.

A computing device made according to my invention which performs this computation is illustrated in FIG. 5.

As shown therein, the computing device includes an analog to digital converter of the feedback type generally indicated at 60. The converter 60 includes the same elements as the converter 12 of FIG. 2 and will not again be described in detail. A signal source 62 supplies a signal of the form shown in FIG. 3 to the input terminal 14 of the converter 60, and supplies appropriate synchronizing signals to the programmer 64 over lead 66. Two digital storage registers, 68 and 70 are provided, these registers being substantially identical to register A in the converter. A set of transfer gates 72 is associated with register 68 and another set 74 with register 70. Each of the registers 68 and 70 controls a digital to analog converter similar to the digital to analog converter 26 of the converter 60, this converter being identified by the reference numbers 76 and 78. The reference signal for analog to digital converter 78 is the same as that for converter 26 as supplied over lead 80. However the reference signal supplied to converter 76 via lead 82 is the output signal from register 78 and therefore corresponds to the number in the B register 70. The output signal from converter 76 is connected via lead 84 to the summing junction 18 in the converter 60.

The operation of the computing device of FIG. 4 is as follows. At the beginning of the period $t_1$ a synchronizing signal, such as a pulse, is transmitted over lead 66 from the signal source. This signal causes the programmer to send a "START" signal to the analog to digital converter 60 over lead 86 and a "SET" TO 0" signal to the two registers over leads 88 and 90. The analog to digital converter then converts the voltage $V_1$ to a numerical value which appears in register A. At the conclusion of this conversion, a signal indicating conversion is supplied to the programmer 64 on lead 92. While the converter 60 is stopped and holding the number $N_1$ corresponding to $V_1$ in the A register, the programmer sends an appropriate signal over lead 94 to activate the transfer gates 74 and transfer the number stored therein to the B register, after which the transfer gates are closed. At the conclusion of the period $t_1$, another signal is sent to the programmer on lead 66. Upon receipt of this signal the programmer initiates a conversion, but does not set the B and C registers to zero. The signal from the digital to analog converter 76 on lead 84 has no effect since the C register 68 has a zero value stored therein. At the conclusion of the conversion of the voltage $V_2$, the programmer operates transfer gates 72 by sending an appropriate signal over lead 96. This causes the number $N_2$ corresponding to the voltage $V_2$ to be stored in register C. During and after this transfer, the converter 60 merely holds the number in the A register and does not continue conversion of the signal applied to terminal 14. At the end of period $t_2$ a third signal is sent to the programmer which initiates the operation of converter 60.

As will be shown below, the number appearing in the A register during period $t_3$ of FIG. 3 will be a number such that:

(5) $$N_A=N_S \times N_C$$
$$=N_S-N_1 \times N_2$$

where $N_A$ is the number in the A register, $N_S$ is a number corresponding to the signal value, $N_B$ is the number in the B register ($N_1$) and $N_C$ is the number in the C register ($N_2$).

In the absence of any signal from the B and C registers, the following equation holds when the input signal is balanced by the feedback signal:

(6) $$V_S=N_AR$$

where R is the amplitude of the reference signal and $V_S$ is the input signal. For $V_S=V_1$, (7) $$N_1=\frac{V_1}{R}$$

This number is then stored in the B register so that (8) $$N_B=\frac{V_1}{R}$$

Similarly (9) $$N_C=\frac{V_2}{R}$$

With a signal $V_{BC}$ from the C register summed with the signal from the A register at the summing junction, the balance equation becomes; during the period $t_3$:

(10) $$V_S=V_A+V_{BC}$$

where $V_A$ is the signal from the A register. From Equation 7,

(11) $$V_A=N_AR$$

$V_B$, the voltage from the B register digital to analog converter 78 is correspondingly

(12) $$V_B=N_1R$$

but, by Equation (8) $$N_1=\frac{V_1}{R}$$

Therefore:

(13) $$V_B=\frac{V_1}{R}\times R=V_1$$

(14) $V_{BC}=N_C\times$ (reference voltage fed to converter 76) $=N_C\times V_1$ but $$N_C=N_2=\frac{V_2}{R}$$

by Equation 9
Therefore:

(15) $$V_{BC}=\frac{V_1V_2}{R}$$

Substituting in Equation 10:

(16) $$V_S=N_AR-\frac{V_1V_2}{R}$$

or

(17) $$N_A=\frac{V_S}{R}-\frac{V_1V_2}{R^2}=\frac{V_S}{R}-\frac{V_1}{R}\times\frac{V_2}{R}$$

(18) $$=N_S-N_1N_2$$

which is the value which was to be computed.

III. RATIO COMPUTING DEVICES

In the two devices of FIGS. 2 and 4, a programmed constant signal value was either added or subtracted directly to or from the measured value of the signal, or the constant value was multiplied by a second constant present in the signal and added to or subtracted from the signal. In certain applications it is desirable to obtain ratios of the measured signal value with respect to a programmed value. For example, referring to FIG. 5, during the period of $t_1$ a voltage $V_1$ is provided at the input to the analog to digital converter and at the end of this period, a varying signal is provided. It is assumed that it is desired to take the ratio of the signal voltage $V_S$ to the reference value $V_1$ i.e. the desired number in the A register of the computing device is:

(19) $$N_A=\frac{N_S}{N_1}=\frac{V_S}{V_1}$$

Where $N_S$ corresponds to the converted value of the signal $V_S$ if unmodified and $N_1$ is the number corresponding to the converted value of the voltage $V_1$. The voltage $V_1$ may represent a scaling factor or similar physical quantity. A computing device for performing this calculation is shown in FIG. 6.

As shown, in FIG. 6, I provided an analog to digital converter generally indicated at 100 and included within the dotted outline similar to that provided in FIGS. 2 and 4. The reference numeral designations for the components of the analog to digital converter generally indicated at 100 are the same as those in FIGS. 2 and 4. The signal source 102 provides an input signal substantially identical to that shown in FIG. 5. The output signal from the source 102 is connected to the input terminal 14 of the converter 100. Additionally, a set of transfer gates 104 are provided which transfer the signal from the A register 24 of the analog to digital converter 100 to the B register 106 which is substantially identical in construction to the A register. Register B in turn controls the digital to analog converter 108 of the type heretofore described. The reference signal from the source 28 is supplied to digital to analog converter 108 and the output signal from digital to analog converter 108 is in turn connected via lead 110 as the reference input to the digital to analog converter 26. A programmer 112 is provided and receives from the signal source 102 (or equipment associated with it) synchronizing signals over the lead 114.

The operation of the circuit of FIG. 6 is as follows. At the start of the period $t_1$, a "START" signal is sent over the lead 114 (which may of course be composed of several leads, the start signal being sent over one of them) to the programmer 112. The programmer 112 then sends an appropriate signal over the lead 116 to the analog to digital converter at 20 to cause it to begin conversion. At the same time, the programmer 112 sets the B register 106 at full scale by sending an appropriate signal over the lead 118. By setting the B register 118 to full scale the digital to analog converter 108 transmits to the digital to analog converter 26 over the lead 110 a signal which is identical with that which would be received if a direct connection were made from the reference source 28 to the converter 26.

Conversion then begins and a number is stored in the A register which corresponds to the voltage $V_1$, i.e.

(20) $$N_A=\frac{V_1}{R}$$

The completion of the conversion is indicated to the programmer 112 by a signal sent from the analog to digital converter 100 over the lead 120. Upon receipt of this signal, the programmer 112 supplies a "SET TO 0" signal to register B over lead 122 and following the application of this voltage to the register B supplies an appropriate signal to the transfer gates 104 over leads 124. The signal on lead 124 causes the gates to transfer the number then stored in the A register into the B register. As previously explained, during this period the analog to digital converter is holding in the A register the number $N_1$, which corresponds to the voltage $V_1$. After completion of these operations, the number originally in the A register is stored in the B register and the converter is ready to process incoming signals. At the end of the period $t_1$, an appropriate signal is sent over the leads 114 and again converter action is initiated. However, the reference now supplied to the digital to analog converter 26 is not the reference from the source 28 but is the reference from the source 28 modified by the number in the B register. As will be shown below, the number appearing in the A register under these conditions is equal to the ratio of the signal to the signal corresponding to the number in the B register.

After the transfer of the number in the A register to the B register, the number in the B register is $$\frac{V_1}{R}$$

Thus, during the period when the signal $V_S$ is supplied to the converter, the output voltage appearing on lead 110 is:

$$V_B=N_BR=\frac{V_1}{R}\times R=V_1 \tag{21}$$

where $V_B$ is the output voltage from the digital to analog converter 108. The voltage applied to the summing junction 18 from the digital to analog converter 26 is $$V_A=N_AV_1 \tag{22}$$

The balance equation during this period is $$V_S=N_AV_1 \tag{23}$$

Rearranging terms we have $$N_A=\frac{V_S}{V_1} \tag{24}$$

Thus, the number appearing in the A register is equal to the signal voltage $V_S$ divided by the voltage during the period $t_1$, the number corresponding to this voltage having been transferred to the B register. In this way, the number from register A appearing on the output cable 126 is proportional to the ratio of the signal and reference voltages.

So far, I have described individual computing elements of the bilingual type for performing simple operations such as addition, subtraction, multiplication of constant values or obtaining ratios. In FIG. 7 I have illustrated a typical signal which may be received from a temperature measuring transducer with calibrated reference voltages included and in FIG. 8 I have indicated how a bilingual computer may be instrumented to provide the measured temperature in digital form.

It is assumed for purposes of this explanation that temperature measurements are available at two known temperatures; thus the span S between these temperatures is also known. The voltage $V_1$ in FIG. 7 for example might correspond to a temperature reference at the freezing point i.e. 32° F. Similarly, the voltage $V_2$ might correspond to a voltage at the boiling point i.e. 212° F. The span S on the diagram of FIG. 7 represents the difference between these two points i.e. 180° The voltage $V_S$ represents the value of the temperature as measured by the transducer. It is assumed that it is desired to provide a digital indication of the temperature in the Fahrenheit scale corresponding to the voltage $V_S$. It is also assumed, for purposes of this discussion, that the scale factor of the transducer is unknown and is to be computed. From FIG. 7:

$$\frac{V_2-V_1}{180°}=\text{S. F. in volts/° F.} \tag{25}$$

where S.F. is the scale factor in volts per degree. Also, the temperature above the reference level, $V_1$ is given by:

$$T\text{ above }V_1=\frac{V_S-V_1}{\text{S.F.}} \tag{26}$$

However, Equation 26 only gives the value of temperature above 32° F. To obtain the actual value in degrees Fahrenheit Equation 27 must have added thereto the temperature at the freezing point i.e. the complete equation for the temperature:

$$\text{T in ° F.}=\frac{V_S-V_1}{\text{S.F.}}+32° \tag{27}$$

It will be observed that it is immaterial whether there is a constant voltage added to the measured values $V_1$, $V_2$ and $V_S$; thus any drift or offset in the transducer is eliminated from measurement. Equation 27 may be transformed as follows to provide simpler computation:

$$T=\frac{V_S-B+CD}{D} \tag{28}$$

where B is equal to $V_1$, C is a constant equal to 32° F. and D is the scale factor, S.F.

A computer for instrumenting an equation of the form of Equation 29 is shown in FIG. 8. As there illustrated, I provided an analog to digital converter of the feedback type similar to that shown in FIGS. 2,4 and 6 and generally indicated at 130. Since this digital to analog converter is substantially indentical to those previously described, I have used identical reference characters for the various components thereof. The three temperature sources i.e. the two references and the transducer are indicated respectively at 132, 134 and 136. Each of these sources are connected to a commutating circuit which measures first the voltage from reference source 132, then the voltage from reference source 134 and finally the temperature from the temperature transducer, all as indicated in FIG. 7.

The commutating circuit 138 transmits these voltages to the input terminal 14 of the analog to digital converter 130. Three storage registers are provided in the circuit of FIG. 8 in addition to the A register 24 associated with the analog to digital converter, the B register 140, the C register 142 and the D register 144. Connections to the B register are similar to those shown in FIG. 2 for the B register.

Thus, the B register 140 is supplied a number from the A register 24 through the transfer gates 146 and controls a digital to analog converter 148. This digital to analog converter is supplied with a voltage directly from the reference source and its output is fed over lead 150 to the summing junction 18. Since no inversion take place the number in register A corresponding to the input signal will have subtracted from it whatever number is in the B register.

The C register 142 has associated with it a set of transfer gates 152 and a digital to analog converter 154. The gates 152, when operated, transfer the number stored in the A register 24 into the C register 142. The C register is also provided with an alternate input from a settable register 156 through a set of transfer gates 158. A constant value set into the settable register 156 may be transferred into the C register by operation of the gates 158. Register 156 is substantially identical to the A, B and C registers except that instead of providing electrically operated inputs, the register may be set manually by switch settings or the like. The reference potential for the digital to analog converter 154 associated with the C register is supplied from amplifier 160 which is an inverting amplifier since, as will be explained below, it is desired to add the C register signal to the number in the A register during signal conversion. The output from digital to analog converter 162 associated with the D register is supplied as an input to amplifier 160. Thus the combination of the D register 144, its associated digital to analog converter 162, and the C register and its associated digital to analog converter 154 perform a function which is substantially identical to that performed by the circuit of FIG. 4 except that an addition as opposed to a subtraction is performed. Thus, the product of the number stored in the C register and the D register will be added to the numbers stored in the A register during signal conversion.

A set of transfer gates 164 are associated with the D register for transferring the number stored in the A register into the D register at appropriate times, in the same way that this was done in FIG. 4. The transfer gates 164 corresponding to the transfer gates 74 of FIG. 4. Also associated with the D register and capable of setting numbers therein is a settable register 168 similar to register 156. Transfer gates 170 connected between the register 168 and the D register when operated will transfer a number in the register 168 into the D register. The function of the settable registers 156 and 168 will be hereinafter described.

A programmer 170 is supplied with synchronizing signals from the commutating circuit 138 over the lead 172. It will be observed that the combination of the D register and its associated digital to analog converter 162 and the A register and its associated analog to digital converter 26 are substantially identical to the combination shown in FIG. 6, the D register corresponding to the B register 106 shown therein and the digital to analog converter 162 corresponding to the analog converter 108 shown therein. Thus the number appearing in the A register will be the ratio of the signals supplied to the summing junction to the signal which generated the number stored in the D register.

It will be apparent from what has gone before that the following equation will characterize the operation of the circuit of FIG. 8 if it is programmed in accordance with the description of FIGS. 2, 4 and 6.

$$A=\frac{N_S-B+CD}{D} \tag{29}$$

To illustrate the manner in which the circuit of FIG. 8 performs the actual computation to provide as a digital output the measured temperature in degrees F. reference will be made to FIG. 9 which is a table showing the values stored in the various registers during the three distinct periods of the incoming signal. At the beginning of the period $t_1$, the signal commutator or other device sends an appropriate initiating signal to the programmer 170, which in turn sets the B register to zero by sending an appropriate signal over the leads 174, sets the C register to zero by sending an appropriate signal over the lead 176, sets the D register to full scale by sending a signal over the lead 178 and initiates converter action by an appropriate signal on lead 180. Under these conditions, no signal is fed to the summing junction over lead 150 from digital to analog converter 148 associated with register B. Also, no signal is fed to the summing junction from digital to analog converter 154 on lead 155 since the C register is set to zero. However the full value of the reference source is supplied to the digital to analog converter 26 as an input signal since register D is set to full scale. Accordingly, the voltage $V_1$ is converted to the number $N_1$ in register A. At the conclusion of the conversion, an appropriate signal is returned to the programmer on lead 182 and the programmer then initiates the following steps. Transfer gates 146 are opened to transfer the number $N_1$ in register A to register B by an appropriate signal sent over lead 184. At the same time, register D is set to zero by sending an appropriate signal over lead 186. When the D register has a zero value, transfer gates 170 are operated via lead 188. The operation of transfer gates 170 transfers to the register D the number set in the settable register 168. This number corresponds to the span S and in the example described would be 180°. Thus, at the beginning of the period $t_2$ register B has stored therein the number $N_1$, register D has stored therein 180° and register C remains at its zero value.

Under these conditions, the number appearing in register $N_A$ will be:

$$N_A=\frac{N_2-N_1}{180°} \tag{30}$$

where $N_2$ is the converted value of $V_2$ and $N_1$ is the converted value of $V_1$ appearing in register B. It will be observed that this number appearing in register A during period $t_2$ is the scale factor previously described. Accordingly, after conversion is initiated and completed, the programmer then resets the register D to zero and operates the transfer gates 164 by an appropriate signal sent over lead 190 to transfer the scale factor into register D. Also, after completion of the conversion of the voltage $V_2$, transfer gates 158 are operated transferring the number in the settable register 156 into the register C. For this example, the number in the settable register 156 would have been manually or otherwise set to 32°. Thus the number in register C is 32°. At the end of period $t_2$ when conversion of the actual signals is to take place, register B has a number corresponding to $V_1$ stored therein i.e. $N_1$. Register C has a number corresponding to 32° stored therein and register D has a number corresponding to the volts per degree or scale factor. The number appearing in register A for applied signals will therefore be:

$$N_A=\frac{N_S-N_1+32°\times \text{S.F.}}{\text{S.F.}} \tag{31}$$

$$=\frac{N_S-N_1}{\text{S.F.}}=32°$$

in which $N_S$ is the digital number corresponding to the signal voltage. It will be observed that Equation 31 is equivalent to Equation 27 which was derived from a consideration of FIG. 7. Further, the product of the scale factor and the number stored in register C is added to the signal rather than being subtracted from it and it is for this reason that the inverting amplifier 160 is provided. Thus the signal from the digital to analog converter 154 is of opposite polarity to the other signals and therefore adds to the input signal. It will also be observed that the transfer gates 152 and their associated control lead 192 are not utilized in this particular program. However, they have been included in the circuit diagram of FIG. 8 for purposes of completeness.

It will thus be seen that I have provided a family of computing devices which convert constant values programmed with varying analog signals to digital signals and store these constant values in digital form. When it is desired to compute using these constant values they may be transferred back to analog form and utilized with the analog to digital converted. Devices made according to my invention utilize analog to digital converters of the feedback type and associated transfer gates, storage registers, and digital to analog converters of conventional design. The particular programmer for use with computation devices made according to my invention will depend upon the particular circuits utilized and the particular program desired. I have also illustrated how the computation devices of FIGS. 2, 4 and 6 may be combined to perform the scale factor and other computations necessary to provide a digital temperature read-out in a particular scale from an analog signal when only the temperatures in that scale corresponding to two different reference levels are known. Devices made according to my invention are substantially simpler and less expensive than the digital computers theretofore used in cascade with analog to digital converters and yet perform substantially the same functions.

It will be apparent that while I have illustrated in FIG. 8 one computer which may be made up from the components illustrated in FIGS. 2, 4 and 6, many variations and combinations of these basic elements are possible to provide different computations depending upon the results desired. Accordingly, the circuit of FIG. 8 is to be construed as an example of a computer which may be made utilizing the components of my invention but is not to be construed as limiting my invention in any way.

It will thus be seen that the objects set forth above, among those made apparent from the preceding description, are efficiently attained and, since certain changes may be made in the above constructions without departing from the scope of the invention it is intended that all matter contained in the above description as shown in the accompanying drawing shall be interpreted as illustrative and not in a limiting sense.

It is also to be understood that the following claims are intended to cover all of the generic and specific features of the inventions herein described and all statements of the scope of the invention which, as a matter of language, might be said to fall therebetween.

Having described my invention, I claim:

1. A bilingual computing device comprising, in combination an input terminal for connection to an analog signal source, a summing junction, means connecting said input terminal to said summing junction, an analog to digital converter, means connecting the output signal from said summing junction to said analog to digital converter, a plurality of digital storage registers, a digital to analog converter controlled by each of said storage registers for converting the digital member stored therein to an analog signal, means connecting the digital output signal from said analog to digital converter to a first of said storage registers, means connecting the analog output signal of the digital to analog converter associated with said first storage register to said summing junction, a set of transfer gates, means connecting the digital signals stored in said first digital storage register to the input side of said transfer gates, means connecting the output side of said transfer gates to a second of said digital storage registers, whereby upon operation of said gates the number stored in the first register is transferred to the second register, means for connecting the signal of said second digital to analog converter associated with said second register to said summing junction, and means synchronized with said signal for operating said transfer gates.

2. A bilingual computing device comprising, in combination, an analog to digital converter of the feedback type, said converter including an input terminal, a summing junction, means connecting said input terminal to said summing junction, to provide a first input signal thereto, an analog to digital converter, means connecting the output signal from said summing junction to said analog to digital converter, a first digital storage register, means connecting said analog to digital converter and said register, a first digital to analog converter controlled by said first digital storage register, means supplying an analog signal to said first digital to analog converter, and means connecting the output signal from said first digital to analog converter to said summing junction as a second input signal thereto; a second digital storage register; a first set of transfer gates for transferring the signal from said first digital storage register to said second digital register; a second digital to analog converter controlled by said second storage register; means for supplying an analog signal as an input signal to said second digital to analog converter; means connecting the output signal from said second digital to analog converter to said summing junction; and means for operating said transfer gates at predetermined times determined by said input signal.

3. The combination defined in claim 2 in which the analog signal supplied to both of said digital to analog converters is the same, the output of said second converter being supplied directly to said summing junction.

4. The combination defined in claim 2 in which the output signal of said second digital to analog converter is connected as the input signal of said digital to analog converter forming a part of said analog to digital converter.

5. The combination defined in claim 2 which includes a third digital storage register; a third digital to analog converter controlled by said third digital storage register; a second set of transfer gates for transferring the number stored in the digital storage register associated with said digital to analog converter into said third digital storage register; means for supplying said third digital to analog converter with an analog signal; means connecting the analog output signal from said third digital to analog converter to said summing junction; and means for operating said second set of transfer gates in synchronism with said input signal.

6. The combination defined in claim 5 in which said third digital to analog converter and said first digital to analog converter are supplied from a common analog signal source, and the output of said third digital to analog converter is connected to said second digital to analog converter as an input signal thereto, said second digital to analog converter output signal being connected directly to said summing junction as a third input signal thereto.

References Cited in the file of this patent

Goldberg: Step Multiplier in Guided Missile Computer, "Electronics" (August 1951), pp. 120–124.